United States Patent [19]
Gilliam

[11] Patent Number: 5,320,420
[45] Date of Patent: Jun. 14, 1994

[54] RACE CAR WHEEL

[76] Inventor: James D. Gilliam, Rte. 1, Box 187, Meeker, Okla. 74855

[21] Appl. No.: 550,541

[22] Filed: Jul. 10, 1990

Related U.S. Application Data

[63] Continuation of Ser. No. 318,495, Mar. 2, 1989, abandoned, which is a continuation of Ser. No. 90,135, Aug. 27, 1987, abandoned.

[51] Int. Cl.⁵ .............................................. B60B 21/00
[52] U.S. Cl. ................................. 301/11.1; 301/105.1; 301/111
[58] Field of Search ............... 301/9 R, 9 DN, 9 DH, 301/9 CN, 9 AH, 9 AN, 10 R, 11 R, 11 CD, 30, 31, 63 D, 64 SD; 152/396, 403–405

[56] References Cited

U.S. PATENT DOCUMENTS

| | | | |
|---|---|---|---|
| 776,935 | 12/1904 | Pugh | 301/111 |
| 1,921,131 | 8/1933 | Nelson | 301/11 R |
| 2,019,145 | 10/1935 | Le Jeune | 301/11 R X |
| 2,229,724 | 1/1941 | Burger et al. | 301/63 D |
| 2,271,849 | 2/1942 | Wallace | 301/111 X |
| 2,940,781 | 6/1960 | Erikson | 301/111 X |
| 4,330,914 | 5/1982 | Hood | 301/105 R X |

FOREIGN PATENT DOCUMENTS

| | | | |
|---|---|---|---|
| 0038434 | 2/1985 | Japan | 301/63 P W |
| 0038005 | 2/1988 | Japan | 301/11 R |

Primary Examiner—Russell D. Stormer
Attorney, Agent, or Firm—Dougherty, Hessin, Beavers & Gilbert

[57] ABSTRACT

A wheel assembly for use on a race car. The wheel includes a center piece having an outer portion adapted for attachment to a rim portion of the wheel, a hub portion adapted for engagement with an axle of a race car for mutual rotation therewith, and a transitional portion integrally interconnecting said outer portion and said hub portion. The hub portion is axially offset from the outer portion in a direction toward the axle. In one embodiment, the transitional portion includes a radiused transition area between the outer portion and the hub portion. In a second embodiment, the transitional portion includes an arcuate member extending from the outer portion to a substantially axially centered area on the hub portion. Radially extending webs may be provided for reinforcement between the hub portion and the outer portion. One of the disc and transitional portions defines a plurality of lightning holes therethrough.

7 Claims, 2 Drawing Sheets

RACE CAR WHEEL

RELATED APPLICATIONS

This application is a continuation of co-pending prior U.S. patent application Ser. No. 07/318,495, filed Mar. 2, 1989, now abandoned, which was a continuation of earlier U.S. patent application Ser. No. 07/090,135, filed Aug. 27, 1987, now abandoned.

BACKGROUND OF THE INVENTION

1. Field Of The Invention

This invention relates to race car wheels, and more particularly, to a multi-piece race car wheel having a center portion with an integrally formed hub thereon.

2. Description Of The Prior Art

In the field of automobile racing, a major consideration in the design of any portion of the racing vehicle, including the wheels, is to reduce weight while maintaining adequate strength to avoid failure during competition. Single piece, cast wheels of aluminum and magnesium alloys have been developed to provide a strong, relatively lightweight wheel. However, such cast structures necessarily require large cross-sectional thicknesses to meet strength requirements or casting process requirements, or both. Thus, while such wheels are made of lightweight material, they may not be as light as desirable because of the large thicknesses and the resulting increased material therein.

A lighter weight alternative to single piece cast wheels has been developed for race cars of the type generally referred to as "dirt track racers". Such vehicles are generally driven on relatively short, oval-shaped dirt tracks. During cornering in a race, the driver places the car into a controlled slide or "drift", literally sliding around the entire end of the oval track. Obviously, such cornering techniques place great stress on the wheel structure.

One prior art wheel includes two outer rim portions attached to a dished, centered piece. The centered piece is positioned adjacent to a separate hub which fits on the vehicle axle. On the opposite side of the dished center piece is a ring-like backup plate. The hub has a splined engagement with the axle. A knock-off cap holds the entire assembly in place on the axle.

This prior art wheel has an advantage in that the tire, rim portions and center piece may be detached from the hub while the hub is still on the vehicle in the event that the hub becomes jammed on the axle. This makes later removal of the hub easier because greater access to the hub is provided. However, a great disadvantage to this wheel is that the number of pieces necessarily increases the weight. In the highly competitive world of auto racing, reduced weight becomes a primary consideration over ease of repair or cost.

The race car wheel of the present invention solves this problem and provides a lighter weight wheel by using a single center portion which is attachable to outer rim portions. The center portion has a hub integrally formed therein and offset as necessary with respect to the rim portions.

SUMMARY OF THE INVENTION

The race car wheel of the present invention comprises a center piece and a pair of rim portions. The center piece comprises an outer portion adapted for attachment to the rim portions of the wheel, a hub portion adapted for engagement with an axle of a race car for mutual rotation therewith, and a transitional portion integrally interconnecting the outer and hub portions. The wheel further comprises sealing means for sealing around a radially outer edge of the outer portion of the center piece.

Preferably, the hub portion of the center piece is axially offset from the outer portion in a direction toward the axle. The hub portion defines a splined bore therethrough for engaging a splined surface on the axle.

At least one of the outer and transitional portions defines a plurality of angularly spaced lightning holes therethrough. In one embodiment, the center piece preferably comprises a plurality of webs extending from a location on the outer portion radially spaced from the hub portion to a location on the hub portion axially spaced from the outer portion. The webs preferably extend between the lightning holes.

In a first embodiment, the transitional portion of the center piece comprises a radiused area providing a transition between the outer portion and the inner hub portion. Thus, a radiused corner portion is formed for providing a gradual increase in thickness between the outer portion and the hub portion.

In a second embodiment, the transitional portion of the center piece comprises an arcuate transitional portion or member extending from a radially inner side of the outer portion to an area on the hub portion axially spaced from the outer portion. Preferably, this area on the hub portion is substantially axially centered thereon.

An important object of the invention is to provide a lightweight race car wheel.

Another object of the invention is to provide a multi-piece race car wheel with a single center portion having an offset hub integrally formed thereon.

A further object of the invention is to provide a simplified, lightweight race car wheel which is interchangeable with previously known wheels.

Still another object of the invention is to provide an improved race car wheel having a strong, lightweight, single piece center portion.

Additional objects and advantages of the invention will become apparent as the following detailed description of the preferred embodiments is read in conjunction with the drawings which illustrate such preferred embodiments.

DETAILED DESCRIPTION OF THE PREFERRED EMBODIMENT

Figure 1:
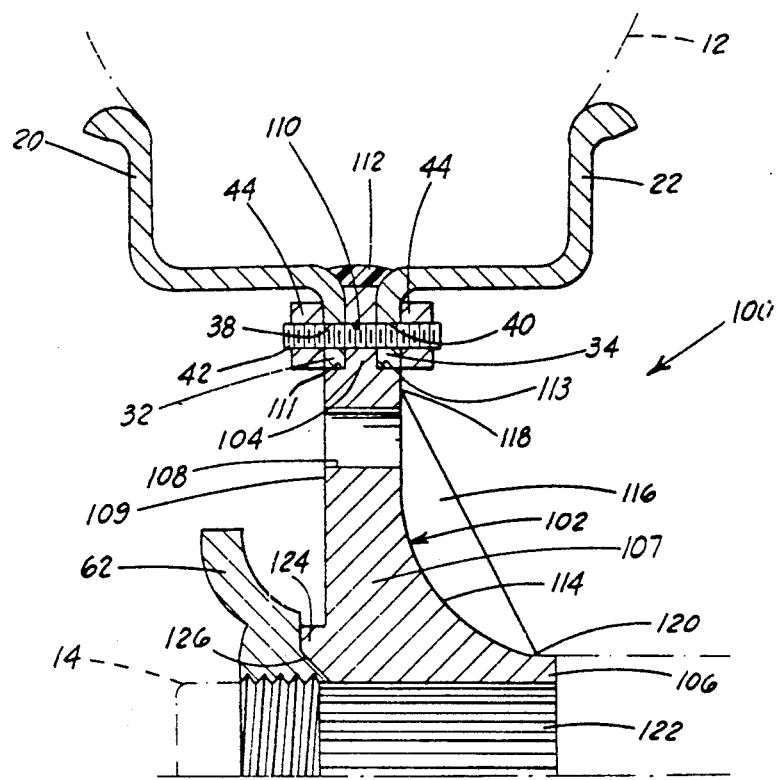
FIG. 1 is a vertical cross-sectional half view of a first embodiment of the race car wheel of the present invention.
Figure 2:
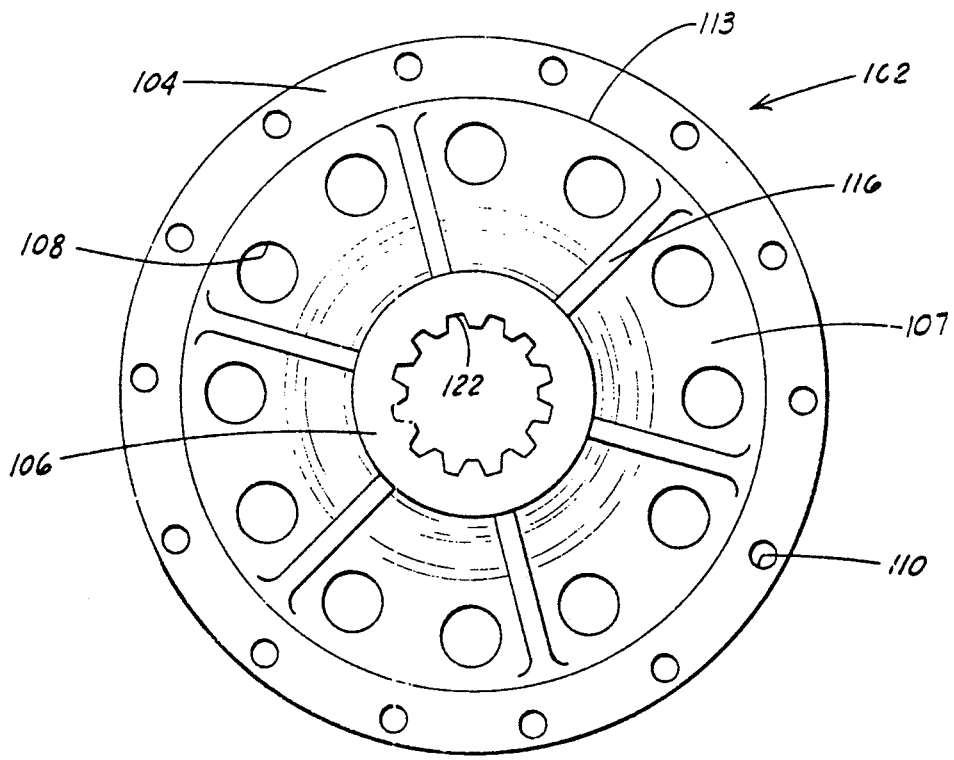
FIG. 2 shows the center portion of the race car wheel of the first embodiment with the rim portions removed, as viewed from the axle side of the center portion.

Referring now to the drawings, and more particularly to FIGS. 1 and 2, a first preferred embodiment of the race car wheel assembly of the present invention is shown and generally designated by the numeral 100.

Wheel assembly 100 includes a center portion 102, along with first and second rim portions 20 and 22.

Center portion 102 comprises an outer disc or ring-shaped portion 104, an inner hub portion 106, and a transitional portion 107 interconnecting outer portion 104 and hub portion 106 and is integrally formed therewith. Outer portion 104 preferably defines a plurality of angularly spaced lightening holes 108 therethrough, although the holes may be partially in transitional portion 107. Outer portion 104 and transitional portion 107 form a substantially planar axially outer side 109.

Outer portion 104 also defines a plurality of mounting holes 10 therethrough which are alignable with holes 38 and 40 in flange portions 32 and 34 of first and second rim portions 20 and 22, respectively. A stud 42 is positioned through the aligned holes, and the assembly is held together by nuts 44. Outer portion 104 further defines a pair of shoulders 111 and 113 which act as guides for flange portions 32 and 34, respectively.

A sealing means, such as a silicon sealer, extends around the radially outer edge of outer portion 104 and adjacent first and second rim portions 20 and 22. Thus, wheel assembly 100 may also be used with a tubeless tire 12.

Transitional portion 107 between outer portion 104 and inner hub portion 106 is gradual and preferably comprises a radiused area 114. A plurality of radially extending reinforcing webs 116 provide additional structural support and strength for center portion 102. Webs 116 extend angularly as shown in FIG. 1 from a location 118 on outer portion 104 radially outwardly spaced from hub portion 106 to a location 120 on hub portion 106 axially inwardly spaced from outer portion 104. Preferably, as best illustrated in FIG. 1, the greater portion of hub portion 106 extends axially inwardly on center portion 102 such that an axial offset is achieved.

Hub portion 106 defines an axially extending splined bore 122 therethrough which is adapted for engagement and rotation with the splined outer surface of axle 14. Preferably, hub portion 6 is axially offset such that the location of splined bore 122 with respect to tire 12 is substantially the same as the relationship between a splined bore and tire on prior art wheels. In other words, wheel assembly 100 is preferably totally interchangeable with prior art wheels.

Axially outer end 124 of hub portion 106 has an inner chamfer 26 therein adjacent splined bore 122. Knock-off 62 thus engages outer end 124 and chamfer 126 therein when threadingly engaged with axle 14.

Figure 3:
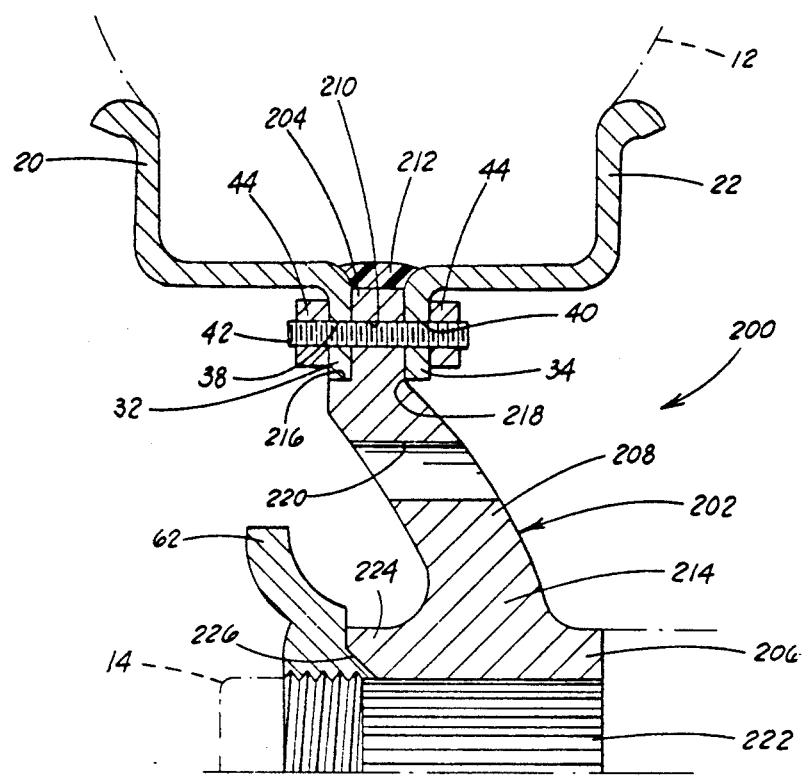
FIG. 3 is a vertical cross-sectional half view of a second embodiment of the race car wheel of the present invention.
Figure 4:
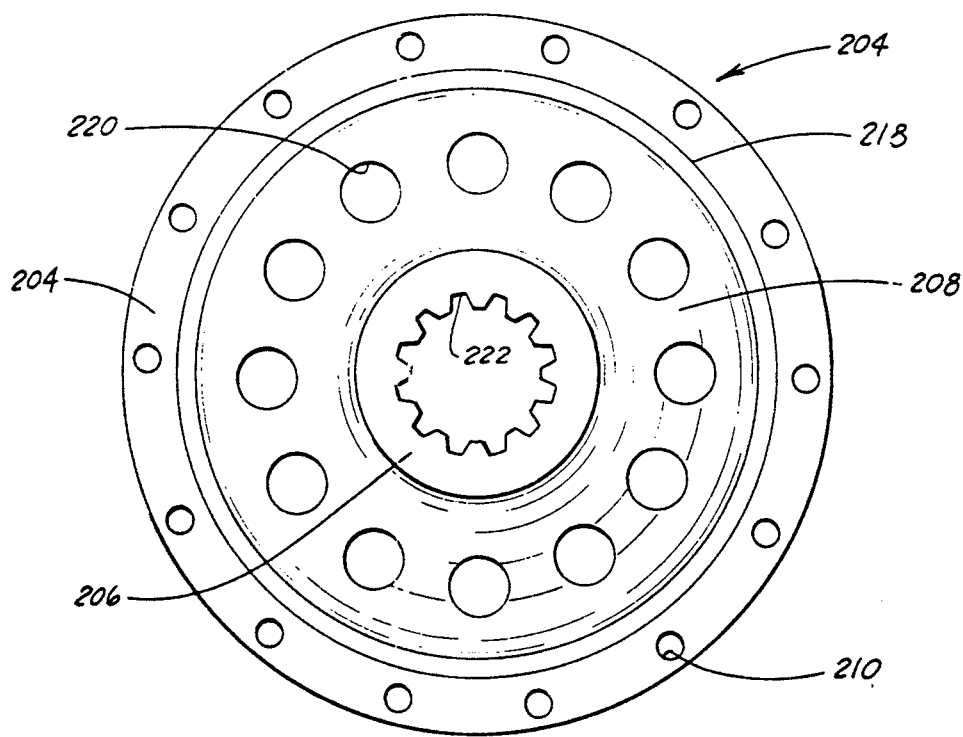
FIG. 4 illustrates the center portion of the race car wheel of the second embodiment with the rim portions removed, as viewed from the axle side of the center portion.

Referring now to FIGS. 3 and 4, a second preferred embodiment of the race car wheel assembly of the present invention is shown and generally designated by the numeral 200. Wheel assembly 200 utilizes some of the components as first embodiment wheel 100, and those components will be identified by the same reference numerals already indicated. Wheel assembly 200 includes a center portion 202, along with first and second rim portions 20 and 22.

Center portion 202 comprises an outer disc or ring-shaped portion 204 and an inner hub portion 206 integrally connected to the outer portion by transitional portion 208.

Outer portion 204 defines a plurality of mounting holes 210 therethrough which are alignable with holes 38 and 40 in flange portions 32 and 34 and first and second rim portions 20 and 22, respectively. As with first preferred embodiment wheel assembly 100, a stud 42 is positioned through the aligned holes, and the assembly is held together by nuts 44. A sealing means 212, such as a silicone sealer, and substantially the same as sealing means 112 in first embodiment wheel assembly 100, extends around the radially outer edge of outer portion 204 and adjacent firs and second rim portions 20 and 22. Thus, wheel assembly 200 may be used with a tubeless tire, just as with the other wheel.

Transitional portion 208 is preferably arcuate in configuration and is disposed such that it intersects the radially inner part of outer portion 204 and intersects hub portion 206 at an area 214 which is axially offset with respect to outer portion 204. On the axially outer side of center portion 202, the intersection of transitional portion 208 and outer portion 204 defines an annular shoulder 216 thereon which acts as a guide for positioning flange portion 32 of first rim portion 20. On the radially inner side of center portion 202, a corner 218 is formed at the intersection of transitional portion 208 and outer portion 204 which serves to guide flange portion 34 of second rim portion 22. Preferably, as illustrated in FIG. 3, transitional portion 208 is configured such that an axial offset of hub portion 206 with respect to outer portion 204 is achieved. In other words, the relationship between hub portion 206 and outer portion 204 and wheel assembly 200 is substantially the same as the relationship between hub portion 106 and outer portion 204 in first embodiment wheel assembly 100.

Transitional portion 208 defines a plurality of lightning holes 220 therethrough. The thickness of transitional portion 208 is such that additional reinforcing between hub portion 206 and outer portion 204 is not ordinarily necessary, although such reinforcing could be added if desired.

Hub portion 206 defines an axially extending splined bore 222 therethrough which is adapted for engagement and rotation with a splined outer surface of axle 14. As already mentioned, hub portion 206 is axially offset such that the location of splined bore 222 with respect to tire 12 is substantially the same as the relationship between the spline bore and tire on the prior art wheel assembly and the relationship between splined bore 122 and tire 12 in first embodiment wheel assembly 100.

Axially outer end 224 of hub portion 206 has an inner chamfer 226 therein adjacent splined bore 222. Knock-off 62 thus engages outer end 224 and chamfer 226 therein when threadingly engaged with axle 14.

Wheel assemblies 100 and 200 with their single piece center portions 102 and 202, respectively, have been constructed such that they are considerably lighter than the prior art counterpart. Either new embodiment results in a substantial weight reduction on a race car which is a major advantage in a sport in which mere ounces are critical.

It can be seen, therefore, that the race car wheel of the present invention is well adapted to carry out the ends and advantages mentioned as well as those inherent therein. While two presently preferred embodiments of the apparatus have been shown for the purposes of this disclosure, numerous changes in the arrangement and construction of parts may be made by those skilled in the art. All such changes are encompassed within the scope and spirit of the appended claims.

What is claimed is:

1. A single center portion for a race car wheel of the type having a pair of rim portions, said center portion comprising:

a radially outer portion having opposite sides adapted for attachment to said rim portions of said wheel;

a hub portion disposed radially inwardly of said outer portion and adapted for splined engagement with a race car axle for mutual rotation therewith, said hub portion being substantially axially offset from said outer portion such that said hub portion extends more in an axially inward direction with respect to said outer portion than in an axially outward direction; and a transition portion integrally formed with, and interconnecting, said outer portion and said hub portion, said transition portion extending axially inwardly and radially inwardly from a radially inner side of said outer portion, wherein:

an intersection of said outer portion and said transition portion defines an annular shoulder adjacent to one of said opposite sides of said outer portion; and another intersection of said transition portion and said outer portion forms a corner adjacent to the other of said opposite sides of said outer portion.

2. The center portion of claim 1 wherein said transition portion defines a plurality of holes therethrough, said holes being angularly spaced around a central axis of said hub portion.

3. The center portion of claim 1 further comprising a plurality of webs extending from a location on said outer portion radially outwardly spaced from said hub portion to a location on said hub portion axially spaced from said outer portion.

4. The center portion of claim 1 wherein said transition portion comprises a radiused area between said outer portion and said hub portion.

5. The center portion of claim 1 wherein said transition portion is an arcuate transition portion extending from said radially inner side of said outer portion to an area approximately centered axially on said hub portion, said transition portion having a substantially constant cross-sectional thickness.

6. A race car wheel comprising:

a center piece comprising:

an elongated hub portion defining a splined axial opening therethrough adapted for engagement with a splined race car axle;

a substantially annular outer portion radially outwardly spaced from said hub portion and disposed therearound, said outer portion having first and second annular faces on opposite sides thereof and defining a plurality of holes therethrough angularly spaced around said hub portion such that said hub portion extends more in an axially inward direction with respect to said outer portion than an axially outer direction; and a transitional portion integrally formed with said hub and outer portions, said transitional portion being of substantially constant thickness and extending generally radially outwardly from said hub portion at an intermediate portion thereon and curving axially outwardly to a radially inner portion of said outer portion, wherein:

an intersection of said outer portion and said transitional portion defines an annular shoulder adjacent the one of said opposite sides of said outer portion; and another intersection of said transitional portion and said outer portion forms a corner adjacent to the other of said opposite sides of said outer portion; and first and second rim portions adapted for connection to said first and second faces, respectively, of said outer portion.

7. The wheel of claim 6 wherein:

said annular outer portion further includes at least one of a corner and a shoulder radially inwardly of each of said first and second annular faces and adjacent thereto; and radially inward surfaces of said first and second rim portions are substantially adjacent to said one of said corner and shoulder and substantially aligned thereby.

* * * * *